US012675956B2

(12) United States Patent
Chiu et al.

(10) Patent No.: US 12,675,956 B2
(45) Date of Patent: Jul. 7, 2026

(54) SHOWING CONTEXT IN A COMMUNICATION SESSION

(71) Applicant: Apple Inc., Cupertino, CA (US)

(72) Inventors: Shih-Sang Chiu, Menlo Park, CA (US); Alexandre Da Veiga, San Francisco, CA (US); David H. Huang, San Mateo, CA (US); Jonathan Perron, Felton, CA (US); Jordan A. Cazamias, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 137 days.

(21) Appl. No.: 18/367,490

(22) Filed: Sep. 13, 2023

(65) Prior Publication Data

US 2023/0419625 A1 Dec. 28, 2023

Related U.S. Application Data

(63) Continuation of application No. PCT/US2022/021244, filed on Mar. 22, 2022.

(Continued)

(51) Int. Cl.
*G06T 19/00* (2011.01)
*G06V 10/20* (2022.01)
*G06V 10/22* (2022.01)

(52) U.S. Cl.
CPC .......... *G06T 19/006* (2013.01); *G06V 10/235* (2022.01); *G06V 10/255* (2022.01)

(58) Field of Classification Search
CPC ................................................. G06T 19/006
See application file for complete search history.

(56) References Cited

U.S. PATENT DOCUMENTS 9,438,859 B2 9/2016 Kleiner et al.
9,645,394 B2 5/2017 Kinnebrew et al.
(Continued)

FOREIGN PATENT DOCUMENTS

CN 109844854 A 6/2019
WO 2016079470 A1 5/2016
WO 2020018252 A1 1/2020

OTHER PUBLICATIONS

European Patent Office (ISA/EP), International Search Report and Written Opinion of the International Searching Authority, International Application No. PCT/US2022/021244, 11 pages, Jun. 14, 2022.

(Continued)

*Primary Examiner* — Charles Tseng
(74) *Attorney, Agent, or Firm* — Thompson Hine LLP

(57) ABSTRACT

Various implementations provide a representation of at least a portion of a user within a three-dimensional (3D) environment other than the user's physical environment. Based on detecting a condition, a representation of another object of the user's physical environment is shown to provide context. As examples, a representation of a sitting surface may be shown based on detecting that the user is sitting down, representations of a table and coffee cup may be shown based on detecting that the user is reaching out to pick up a coffee cup, a representation of a second user may be shown based on detecting a voice or the user turning his attention towards a moving object or sound, and a depiction of a puppy may be shown when the puppy's bark is detected.

28 Claims, 12 Drawing Sheets

Related U.S. Application Data

(60) Provisional application No. 63/166,328, filed on Mar. 26, 2021.

(56) References Cited

U.S. PATENT DOCUMENTS

| | | | | |
|---|---|---|---|---|
| 10,824,867 B1 * | 11/2020 | Assam | .................... | G06Q 40/08 |
| 2016/0349835 A1 * | 12/2016 | Shapira | ................. | B25J 9/1605 |
| 2017/0178411 A1 | 6/2017 | Mitchell | | |
| 2018/0047395 A1 | 2/2018 | Sommers et al. | | |
| 2018/0373320 A1 | 12/2018 | Petrovskaya et al. | | |
| 2019/0026958 A1 * | 1/2019 | Gausebeck | ............. | G06T 7/579 |
| 2019/0065027 A1 | 2/2019 | Hauenstein et al. | | |
| 2019/0188895 A1 | 6/2019 | Miller, IV et al. | | |
| 2019/0279428 A1 * | 9/2019 | Mack | ........................ | G06T 7/90 |
| 2019/0347846 A1 | 11/2019 | Olson et al. | | |

OTHER PUBLICATIONS

China National Intellectual Property Administration, First Office Action and Search Report issued in Chinese Patent Application No. 202280024826.4 dated Mar. 21, 2026 with English translation (28 pages).

* cited by examiner

1000

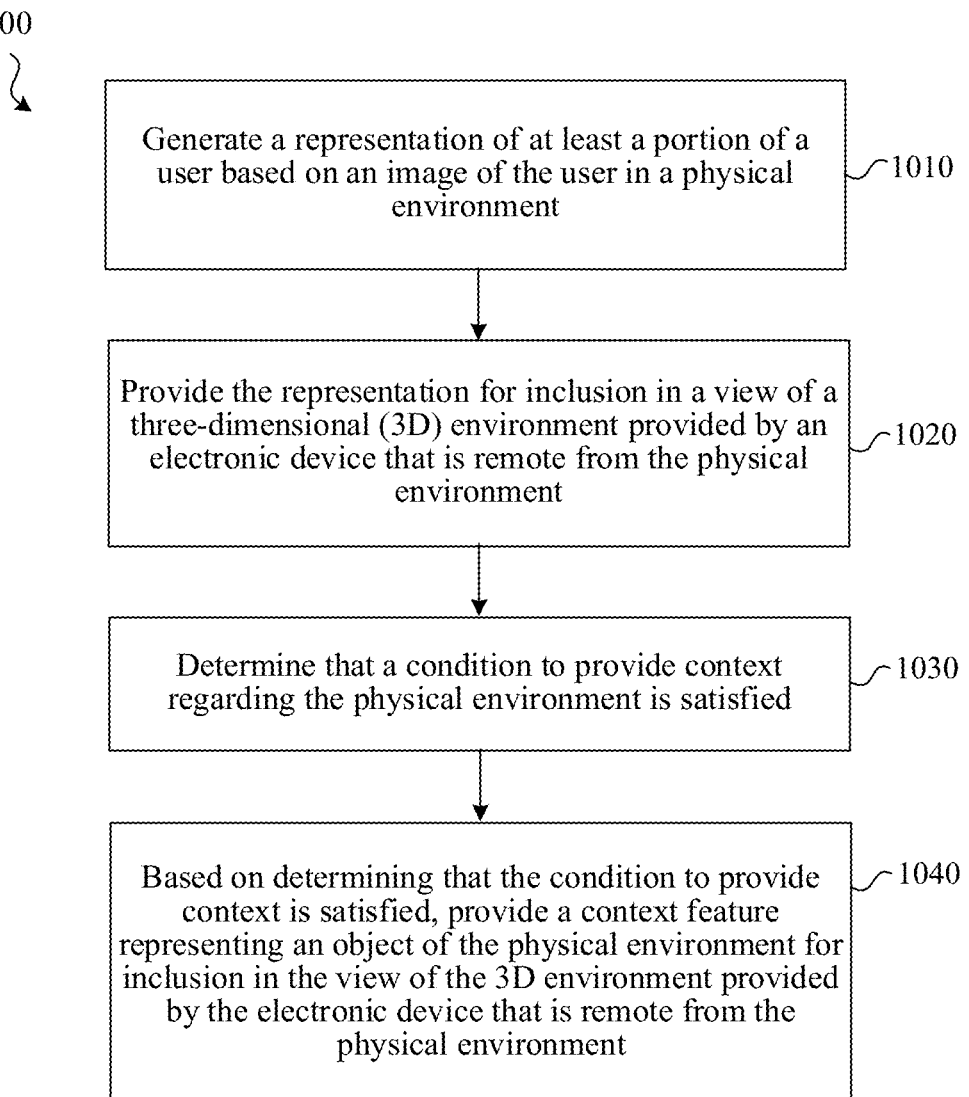

Generate a representation of at least a portion of a user based on an image of the user in a physical environment ⌐1010

Provide the representation for inclusion in a view of a three-dimensional (3D) environment provided by an electronic device that is remote from the physical environment ⌐1020

Determine that a condition to provide context regarding the physical environment is satisfied ⌐1030

Based on determining that the condition to provide context is satisfied, provide a context feature representing an object of the physical environment for inclusion in the view of the 3D environment provided by the electronic device that is remote from the physical environment ⌐1040

SHOWING CONTEXT IN A COMMUNICATION SESSION

TECHNICAL FIELD

The present disclosure generally relates to electronic devices that use sensors to provide views during communication sessions, including views that include representations of one or more of the users participating in the sessions.

BACKGROUND

Various techniques are used to represent the participants of communication sessions such as video conferences, interactive gaming sessions, and other interactive social experiences. For example, the participants may see realistic or unrealistic (e.g., fanciful avatars) representations of the users participating in the sessions. The user representations may move or change based on a user's actions and may be provided without representations of the user's physical environments. Accordingly, when the user interacts with objects of his or her own physical environment that are not also represented in the communication session, the experience for the other users may be confusing or undesirable. For example, when the user drinks from a cup, the other users may view the user's avatar lifting an empty hand towards his or her face and may not understand the nature of the user's action.

SUMMARY

Various implementations disclosed herein include devices, systems, and methods that provide a representation of at least a portion of a user within a three-dimensional (3D) environment other than the user's physical environment during a communication session. Based on detecting a condition, a representation of another object of the user's physical environment is shown to provide context. As examples, a representation of a sitting surface may be shown based on detecting that the user is sitting down, representations of a table and coffee cup may be shown based on detecting that the user is reaching out to pick up a coffee cup, a representation of a second user may be shown based on detecting a voice or the user turning his attention towards a moving object or sound, and a depiction of a puppy may be shown when the puppy's bark is detected.

In some implementations a processor performs a method by executing instructions stored on a computer readable medium. The method generates a representation of at least a portion of a user based on an image of the user in a physical environment. The method provides the representation for inclusion in a view of a three-dimensional (3D) environment provided by an electronic device that is remote from the physical environment. The method determines that a condition to provide context regarding the physical environment is satisfied. For example, this may involve determining that a user action corresponds to an interaction with an object of the environment, e.g., the user is sitting down, reaching out, turning to face another person, etc. In another example, this may involve determining that an activity (e.g., barking, siren, alarm, talking, etc.) in the environment has a characteristic expected to grab the attention of or inspire action by the user. Based on determining that the condition to provide context is satisfied, the method provides a context feature representing an object of the physical environment for inclusion in the view of the 3D environment provided by the electronic device that is remote from the physical environment. As examples, context features may include a sitting surface, a table and cup, a representation of another person, and a representation of a dog, etc. The context feature may accurately depict the object or provide an abstraction that corresponds to the type of object, its purpose, and/or general size/shape to provide context while protecting user privacy.

In some implementations a processor performs a method by executing instructions stored on a computer readable medium. The method generates a view of a 3D environment, e.g., the living room or virtual reality room of a host of a communication session. The view depicts a representation of at least a portion of a user, e.g., realistic avatar generated based on sensor data of the user obtained live during a communication session, where the user is in a physical environment different than the 3D environment.

The method determines that a condition to provide context regarding the physical environment is satisfied. Determining that the condition is satisfied may involve determining that a user action corresponds to an interaction with an object of the physical environment. Determining that the condition is satisfied may involve determining that the user is sitting down, reaching out, turning to face another person, etc. Determining that the condition is satisfied may involve identifying one or more objects in the physical environment capable of interaction. Determining that the condition is satisfied may involve determining that an activity (e.g., barking, siren, alarm, talking, etc.) in the physical environment has a characteristic expected to grab the attention of or inspire action by the user.

Based on determining that the condition to provide context is satisfied, the method updates the view of the 3D environment to include a context feature representing an object of the physical environment. Example context features include, but are not limited to, representations of a sitting surface, a wall, a table, a cup, a ball, a puppy, another person, and a mobile device. The context feature may accurately and realistically depict the object or provide an abstraction that corresponds to the type of object, its purpose, and/or general size/shape to provide context without revealing specific or private information about the user's physical environment and other persons therein.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 10 is a flowchart illustrating a method for providing a representation of at least a portion of a user and context within a 3D environment other than the user's physical environment in accordance with some implementations.

Figure 1:
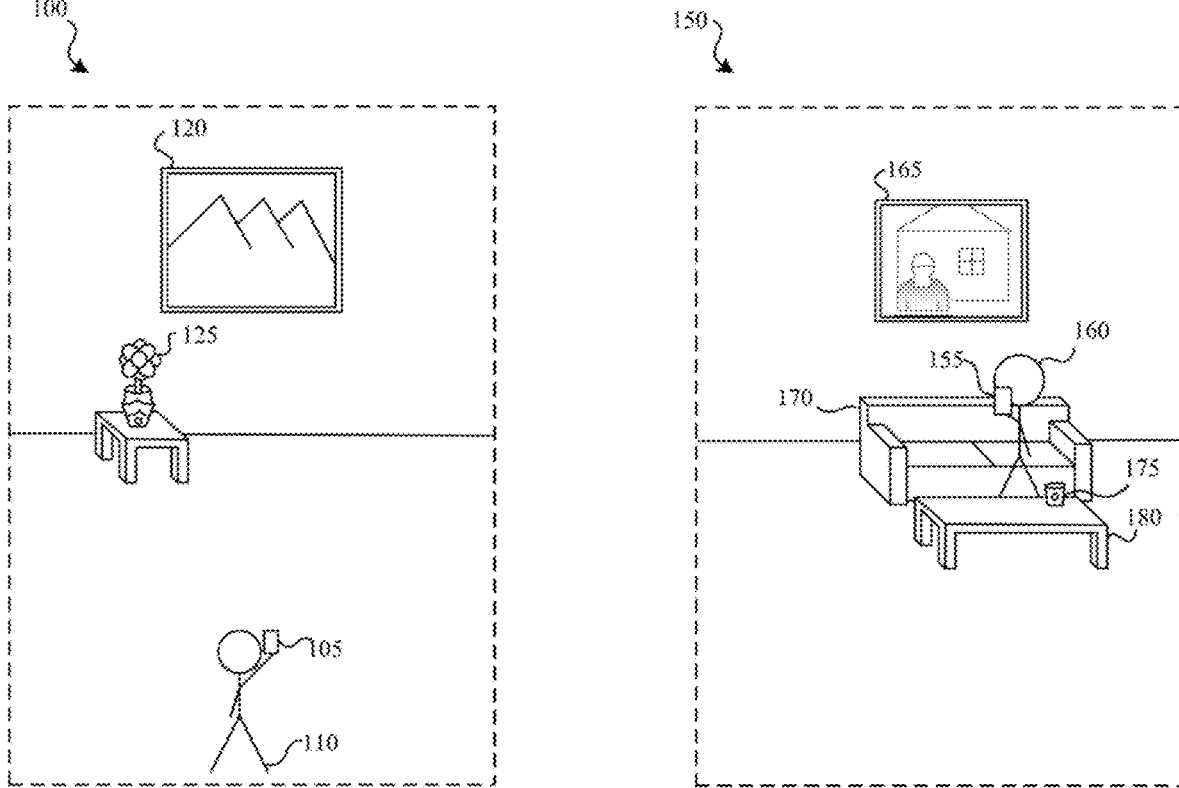
FIG. 1 illustrates exemplary electronic devices operating in different physical environments during a communication session in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates exemplary electronic devices 105, 155 operating in different physical environments 100, 150 during a communication session, e.g., while the electronic devices 105, 155 are sharing information with one another or an intermediary device such as a communication session server. In this example of FIG. 1, the physical environment 105 is a room that includes a wall hanging 120 and a vase 125 with flowers on a table. The electronic device 105 includes one or more cameras, microphones, depth sensors, or other sensors that can be used to capture information about and evaluate the physical environment 100 and the objects within it, as well as information about the user 110 of the electronic device 105. The information about the physical environment 100 and/or user 110 may be used to provide visual and audio content during the communication session. For example, a communication session may provide views to one or more participants (e.g., users 110, 160) of a 3D environment that is generated based on camera images and/or depth camera images of the physical environment 100 as well as a representation of user 110 based on camera images and/or depth camera images of the user 110.

In this example, the physical environment 150 is a room that includes a wall hanging 165, a sofa 170, and a coffee cup 175 on a coffee table 180. The electronic device 155 includes one or more cameras, microphones, depth sensors, or other sensors that can be used to capture information about and evaluate the physical environment 150 and the objects within it, as well as information about the user 160 of the electronic device 155. The information about the physical environment 150 and/or user 160 may be used to provide visual and audio content during the communication session. For example, a communication session may provide views of a 3D environment that is generated based on camera images and/or depth camera images (from electronic device 105) of the physical environment 100 as well as a representation of user 160 based on camera images and/or depth camera images (from electronic device 155) of the user 160. Such views are illustrated in the examples of FIGS. 2-9 described next. However, it should be noted that representations of the users 110, 160 may be provided in other 3D environments. For example, a communication session may involve representations of either or both users 110, 160 that are positioned within any entirely virtual environment or an extended reality (XR) environment that includes some physical environment representations and some virtual environment representations.

Figure 2:
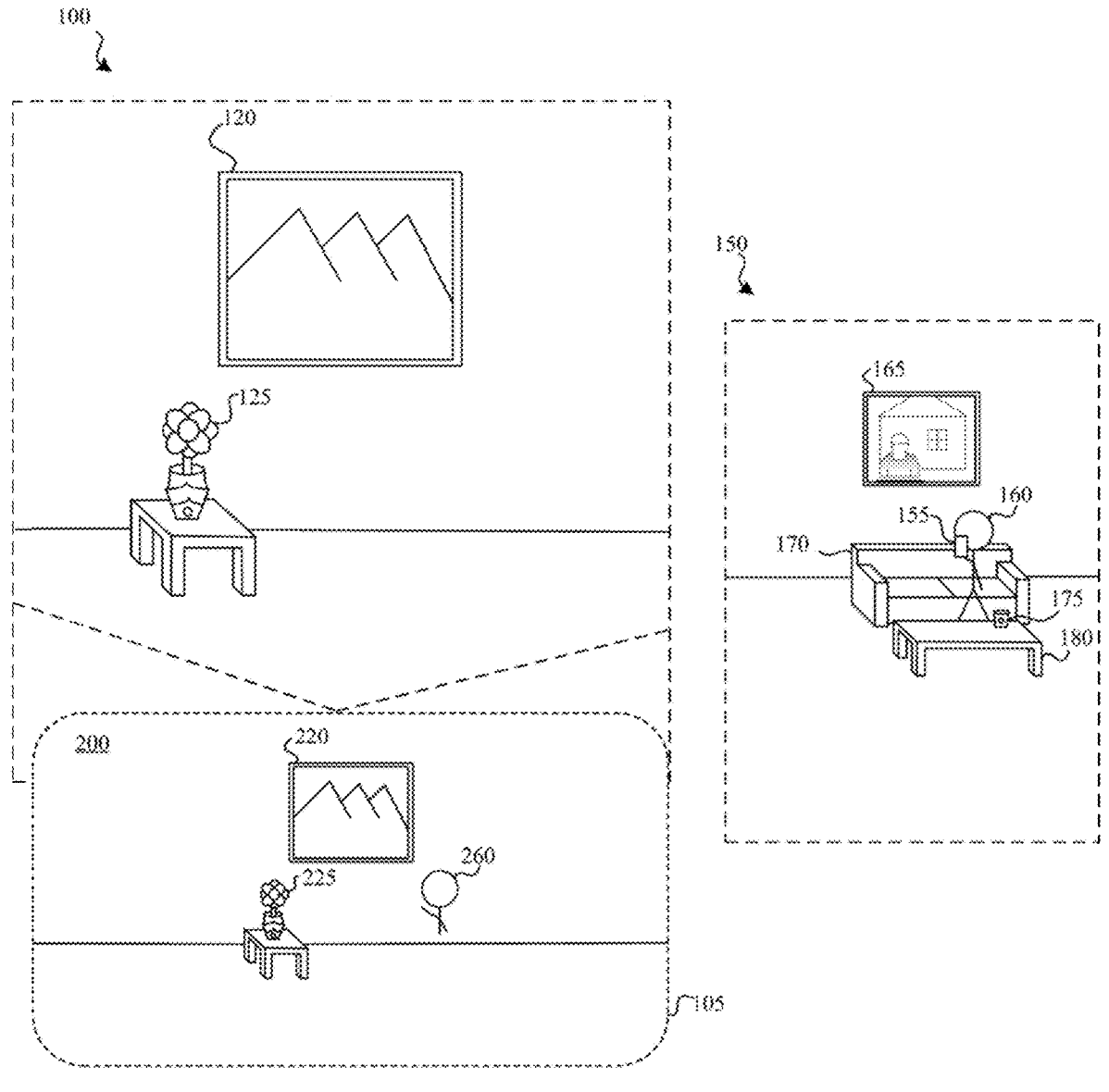
FIG. 2 illustrates an exemplary view of a representation of a user within a 3D environment, where the user is in a physical environment different than the 3D environment.

FIG. 2 illustrates the exemplary electronic device 105 of FIG. 1 providing a view 200 during a communication session with electronic device 155. In this example, during the communication session, the electronic device 105 provides a view 200 that enables user 110 to view a representation 260 of at least a portion the user 160 (e.g., from mid-torso up) within a 3D environment that corresponds to physical environment 100. Thus, the view 200 incudes the representation 260 of the user 160 (from physical environment 150) along with representations 220 of wall hanging 120 and representation 225 of the flowers 125 on the table (from the physical environment 100). Moreover, the representation 260 of the user 160 may provide a live, real-time view of the user 160, e.g., based on sensor data including images and other sensor data of the user 160 obtained during the communication session. As the user 160 moves around, makes hand gestures, and makes facial expression, corresponding movements, gestures, and expressions may be displayed for the representation 260 in the view 200. For example, as the user 160 moves left two feet in physical environment 150, the view 200 may show the representation 260 moving left two feet in the view 200 corresponding to physical environment 100.

The representation 260 of user 160 may be realistic or unrealistic and/or may represent a current and/or prior appearance of the user 160. For example, a photorealistic representation of the user 160 may be generated based on a combination of live images and prior images of the user. The prior images may be used to generate portions of the representation 260 for which live image data is not available (e.g., portions of a user's face that are not in view of a camera or sensor of the electronic device 155 or that may be obscured, for example, by a headset or otherwise). In one example, the electronic device 155 is a head mounted device (HMD) and live image data of the user's face includes a downward facing camera images of the user's checks and mouth and inward facing camera images of the user's eyes, which may be combined with prior image data of the user's other portions of the users face, head, and torso that cannot be currently observed from the sensors of the device 155. Prior data regarding a user's appearance may be obtained at an earlier time during the communication session, during a prior use of the electronic device, during an enrollment process used to obtain sensor data of the user's appearance from multiple perspectives and/or conditions, or otherwise.

Some implementations provide a representation of at least a portion of a user within a 3D environment other than the user's physical environment during a communication session and, based on detecting a condition, provide a representation of another object of the user's physical environment to provide context. For example, during the communication session illustrated in FIG. 2, representations of one or more other objects of the physical environment 150 may be displayed in the view 200. For example, based on determining that the user 160 is interacting with a physical object in physical environment 150, a representation (e.g., realistic or proxy) may be displayed in view 200 to provide context for the interaction of the user 160.

Figure 3:
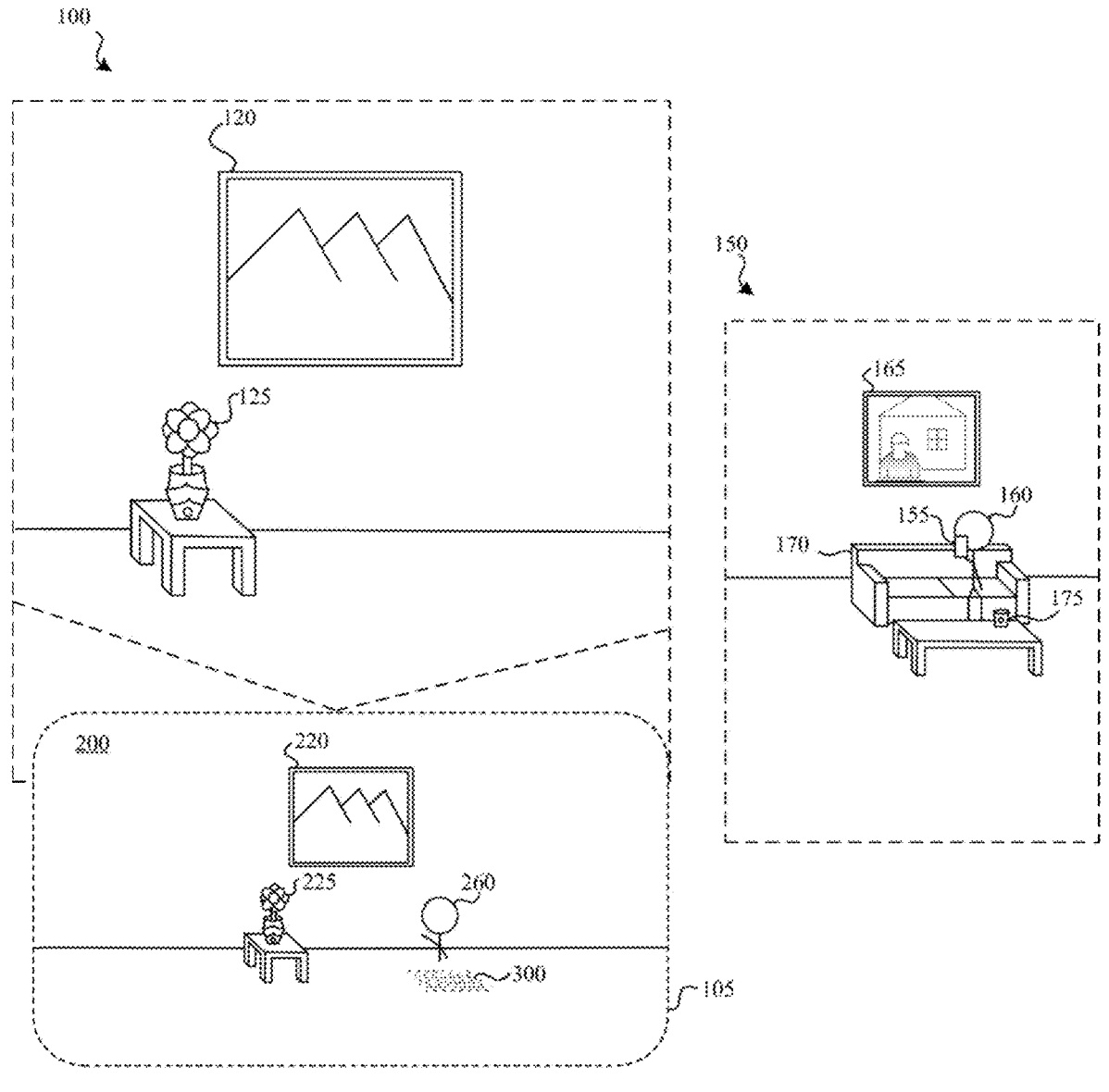
FIGS. 3, 4, 5, 6, 7, 8, and 9 illustrate various examples of providing context within the view of the 3D environment of FIG. 2, where the context corresponds to the physical environment of the user.

FIG. 3 illustrates user 160 sitting down in physical environment 150. Sensors on electronic device 155 may detect this activity. An activity may be detected, for example, based on detecting movement (e.g., distance, direction, speed, type of movement) of the user 160 and/or a relative position of an object such as the couch 170 below the user 160, e.g., whether a portion of the couch 170 is touching or about to touch the user 160. In some implementations, a body motion of the user 160 is classified or otherwise assessed. In some implementations, a posture of the user is generated based on sensor data (e.g., a model identifying 3D positions of joints of the user 160). Generally, computer programs and/or machine learning models may be used to interpret sensor data to identify user activity and/or environmental features that satisfy a condition to provide context.

In this example of FIG. 3, detecting a sitting condition satisfies criteria for displaying a context feature to provide context. This may involve detecting (a) a user motion (e.g., torso moving downward, legs flexing, etc.) and (b) an interactive object corresponding to the motion (e.g., couch 170 is in the direction of the motion).

In this example, an abstract representation 300 of a portion of the couch 170 is provided in view 200. The representation 300 provides context that may enable a viewer (e.g., user 110) of view 200 to more easily interpret the action of user 160 or otherwise improve the viewer's experience, e.g., to more easily recognize understand that user 160 is sitting down.

In the example of FIG. 3, representation 300 is a point cloud representation that is based on the position of the couch 170 relative to the user 160 in the physical environment 150. The characteristics of the representation 300 limit the amount of information about the physical environment 150 that is revealed in the view 200. In this example, the point cloud representation does not reveal the type, size, or shape of the couch 170. The user 160 may be asked to consent to and/or provide preferences defining the revealing of information about the objects within his or her environment, e.g., whether such objects will be revealed to provide context, how much detail will be revealed, to whom such object will be revealed, etc.

The representation 300 may be based on sensor data obtained by electronic device 155, e.g., immediately before the action or sensor data from a prior time that is stored as historical data. The size of the representation 300 may not correspond to the size of the object (e.g., couch 170) that it represents. For example, it may not be necessary to show the full size of the couch 170 to provide context that the user 160 is sitting down. For example, the representation may be limited based on distance from the user 160 (e.g., sized to correspond to a certain radius around the representation 260) and not beyond that distance.

In some implementations, the user activity (e.g., sitting) occurs over time and the representation 260 has characteristics that change (e.g., get revealed) over time. For example, as the user starts sitting, representation 300 may have a faint appearance and, as the user continues sitting, the representation 300 may appear to darken or become denser. In some implementations, information about an object, e.g., couch 170, is obtained over time. Initially, little information may be known about the type, size, shape, condition, etc. of the object based on limited sensor data being available. During such an initial period, an abstract representation may be used. Over time, as more sensor data regarding the object is obtained, the representation may be refined to include more details, consistent with the user's consent and preferences.

Figure 4:
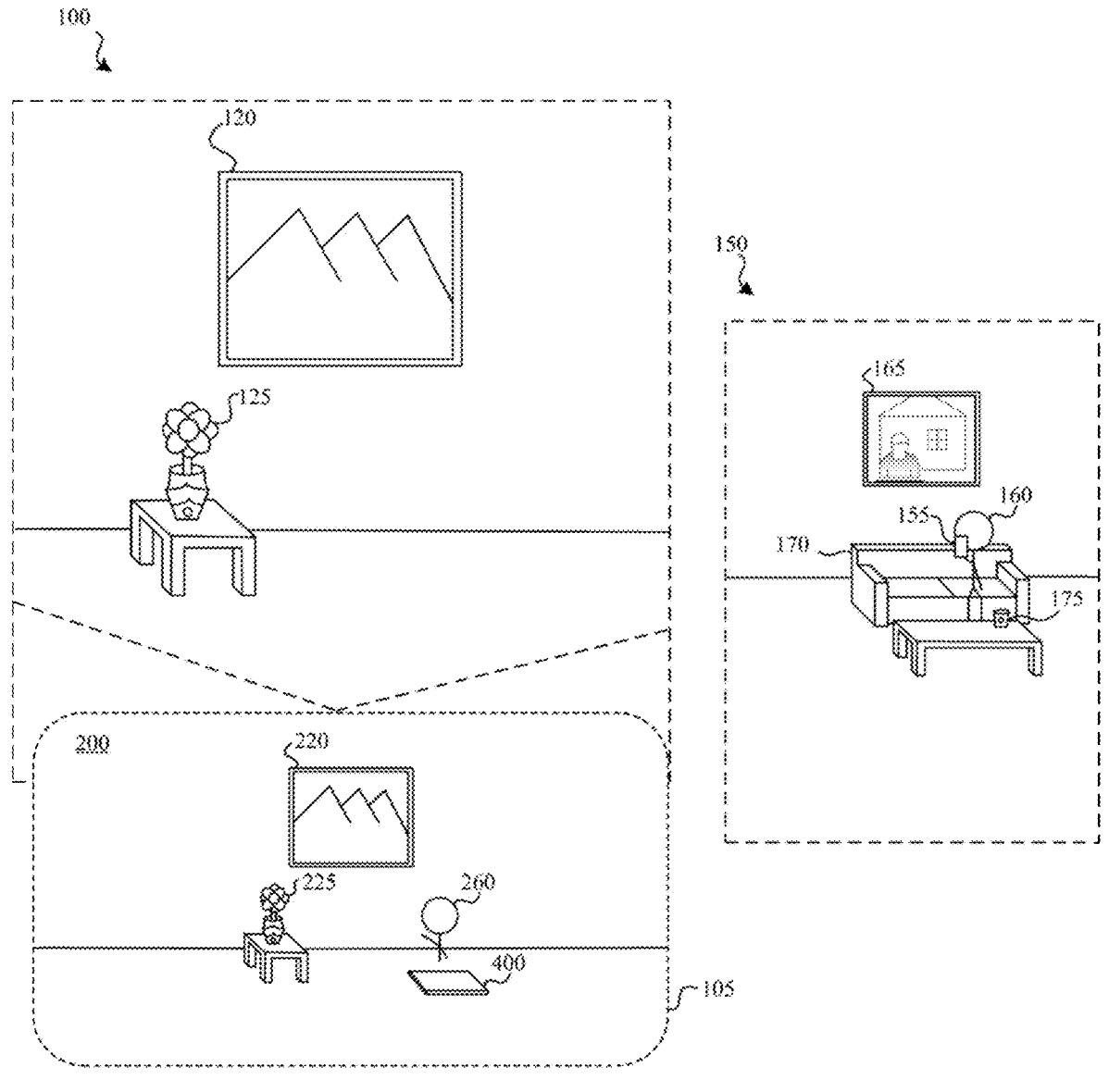

FIG. 4 illustrates another example of user 160 sitting down in physical environment 150. In this example, based on detecting that the user 160 is sitting, a surface-like representation 400 of a portion of the couch 170 is provided in view 200. The representation 400 provides context that may enable a viewer (e.g., user 110) of view 200 to more easily interpret the action of user 160 or otherwise improve the viewer's experience. In this example, the representation 400 is less abstract than the abstract representation 300 of FIG. 3.

Figure 5:
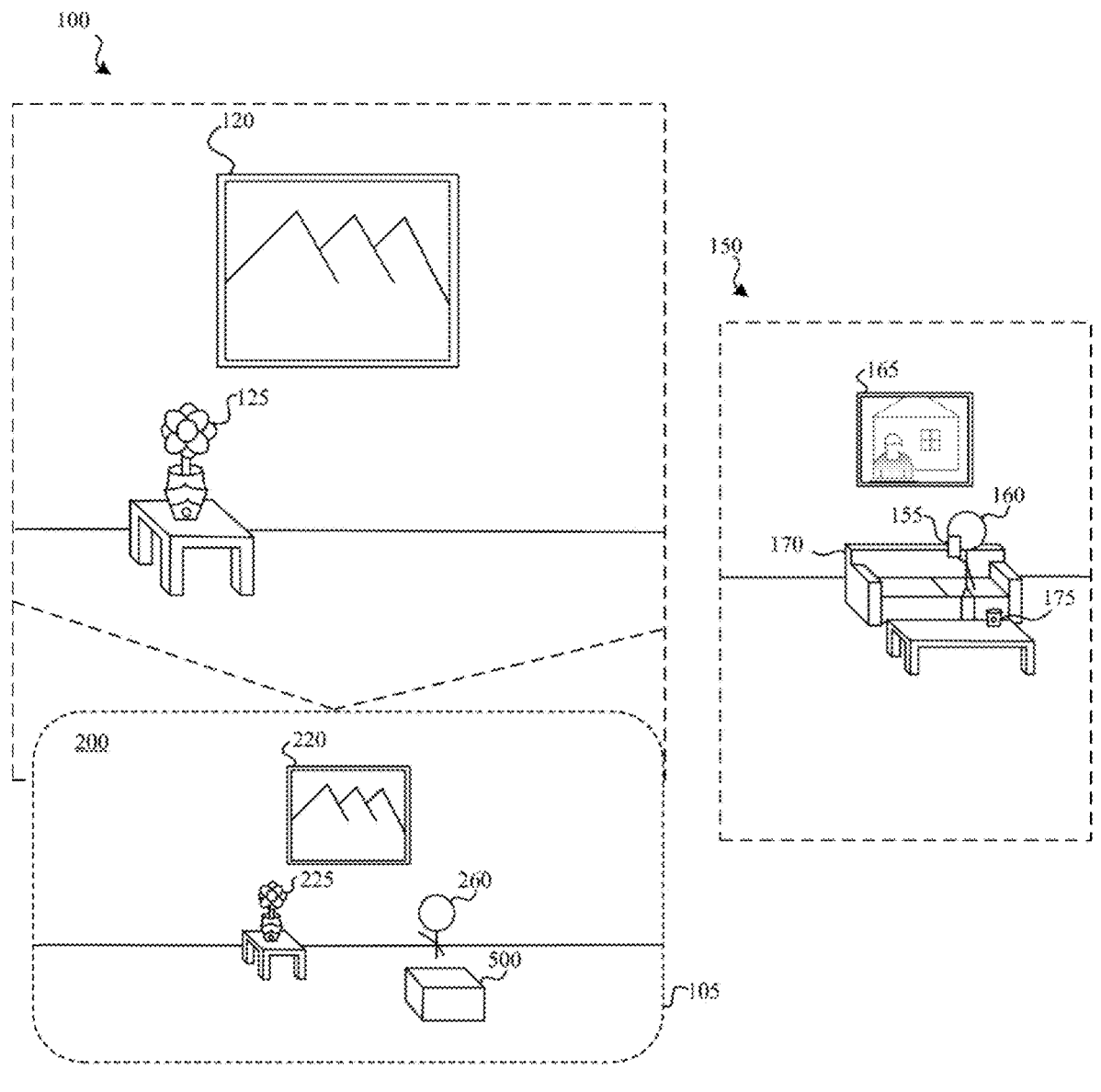

FIG. 5 illustrates another example of user 160 sitting down in physical environment 150. In this example, based on detecting that the user 160 is sitting, an ottoman-like representation 500 (e.g., a virtual or imposter object) representing a portion of the couch 170 is provided in view 200. The ottoman-like representation 500 provides context that may enable a viewer (e.g., user 110) of view 200 to more easily interpret the action of user 160 or otherwise improve the viewer's experience. In this example, the representation 500 may depict more information (e.g., distance above the floor) than the more abstract representations 300, 400 of FIGS. 3 and 4. In this example the ottoman-like representation has a realistic appearance, e.g., it appears like a real-life ottoman, that differs from the realistic appearance of the couch 170 that it represents. Such an imposter object may be used to provide realism while preserving user privacy consistent with the user's consent and preferences.

In some implementations, a representation of an object (such as couch 170) is a realistic representation of an imposter or generic object, such as the ottoman representation 500 of FIG. 5. As another example, rather than using a realistic representation of the couch 170, a representation of a generic couch may be used. A generic couch may be selected based on object type (e.g., couch) or function (e.g., sitting surface) and may or may not have characteristics that correspond to those of the actual couch 170 being represented. In another example, characteristics of an imposter object are intentionally changed from those of the corresponding object of the physical environment, e.g., based on determining that object 170 is a couch, a representation may be selected that is a sitting surface that is intentionally not a couch. In another example, a user provides selections and/or preferences that are used to select imposter objects to use to represent the physical objects of his or her environment. For example, a user may create or select a set of real or virtual objects to use for such representations, e.g., corresponding to a particular theme such as work, gaming, social, etc.

Figure 6:
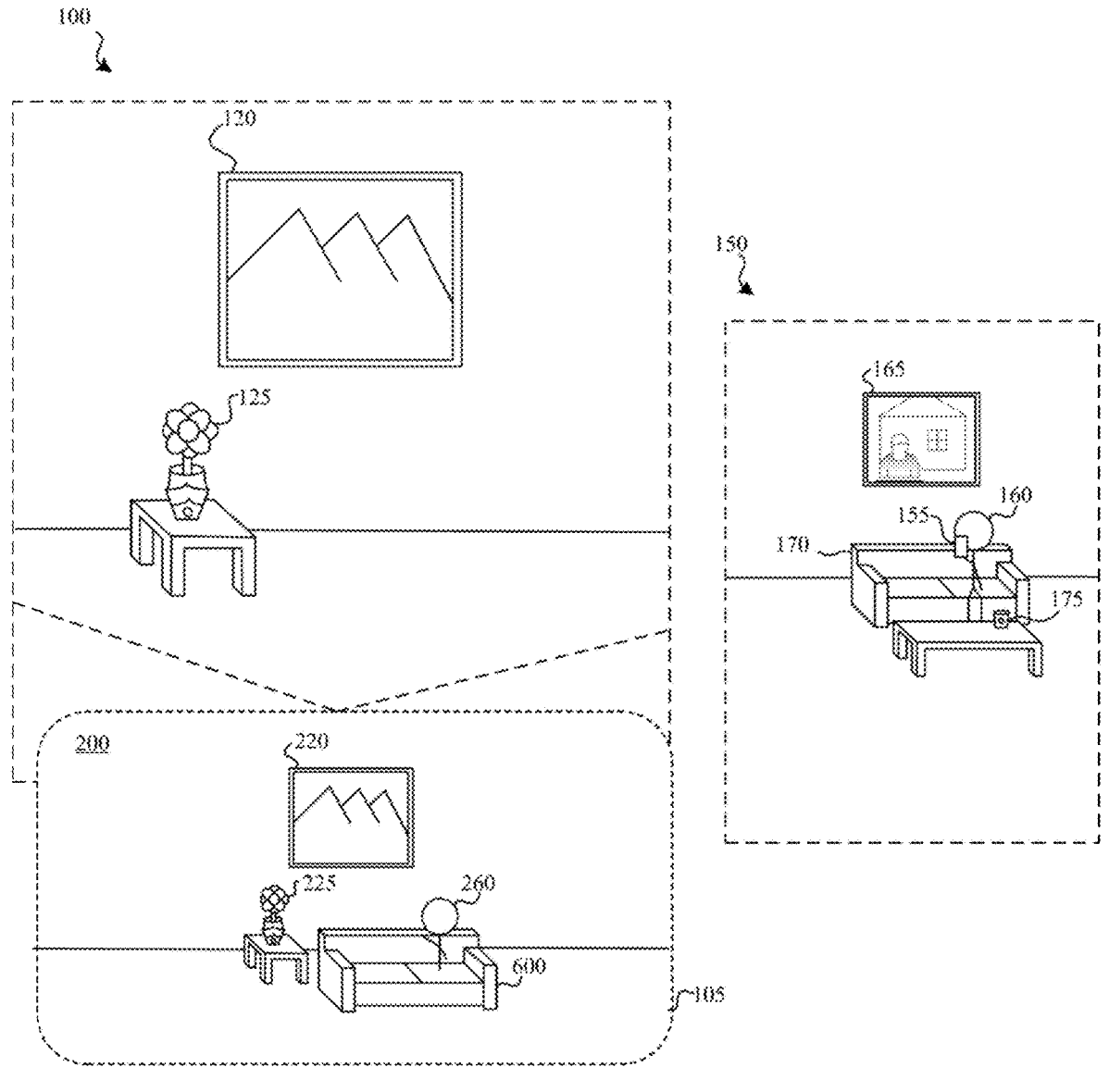

FIG. 6 illustrates another example of user 160 sitting down in physical environment 150. In this example, based on detecting that the user 160 is sitting, realistic representation 600 representing the couch 170 is provided in view 200. The representation has characteristics (e.g., size, position relative to user 160, shape, material, etc.) that correspond to the actual (e.g., live) appearance of the couch 170. Representation 600 may be generated based on live and/or or prior sensor data of the couch 170. Representation 600 may be generated based on generating a 3D model of the couch 170. Portions of the couch 170 that are not observable by sensors may be inferred or generated using various techniques. In one example, an object is matches with a 3D model for which complete information is available, e.g., identifying the particular make and model of the couch 170 based on image/sensor data in which the couch 170 is depicted.

The realistic representation 600 provides context that may enable a viewer (e.g., user 110) of view 200 to more easily interpret the action of user 160 or otherwise improve the viewer's experience. In this example, the representation 600 may depict more real information (e.g., size, shape, material, condition, etc.) than the representations 300, 400, 500 of FIGS. 3-5.

Figure 7:
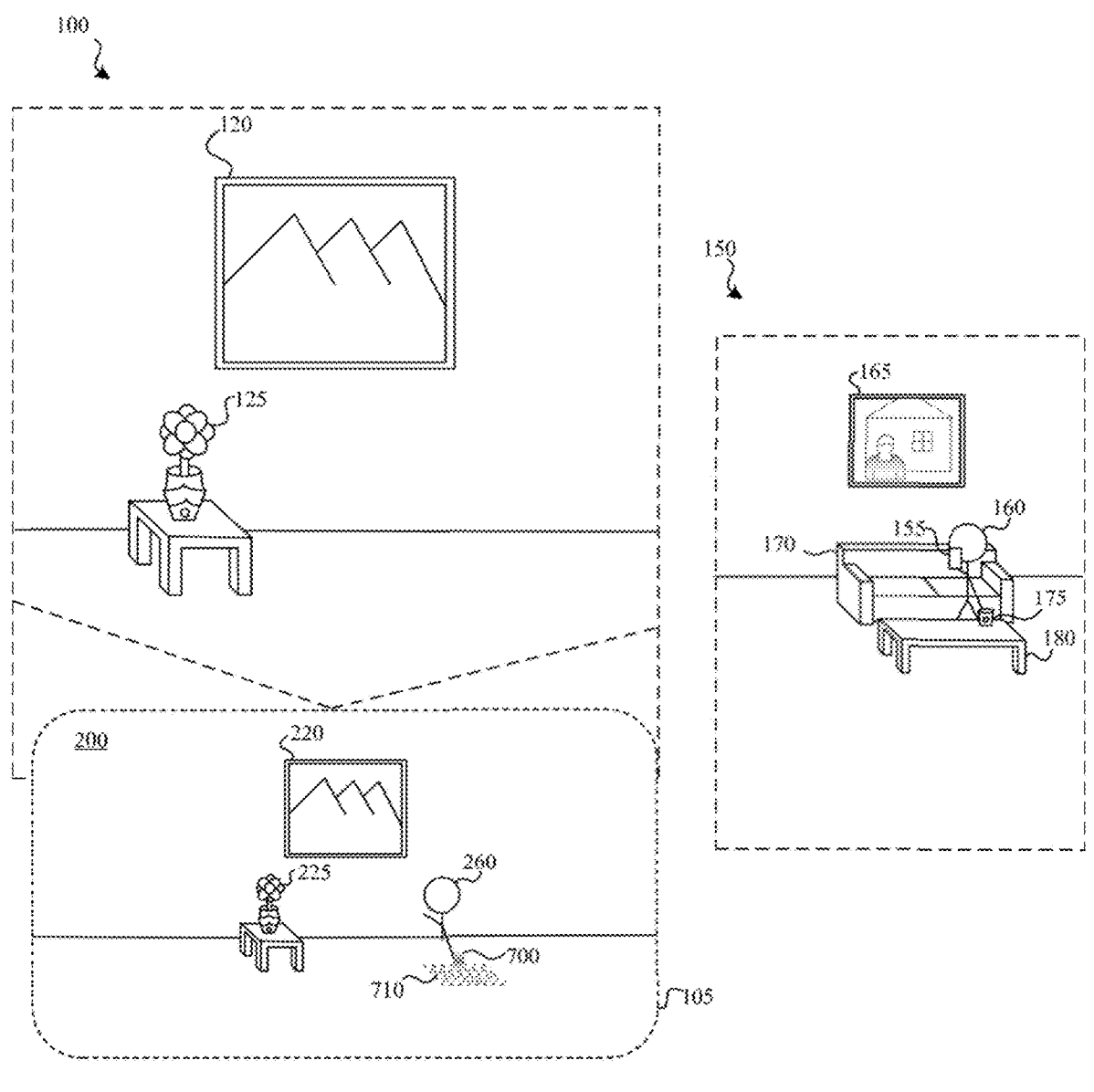

FIG. 7 illustrates user 160 reaching out and grasping the coffee cup 175 in physical environment 150. Sensors on electronic device 155 may detect this activity. An activity may be detected, for example, based on detecting movement (e.g., distance, direction, speed, type of movement) of the user 160, detecting the attention of the user (e.g., using gaze direction to identify what object the user 160 is looking at) and/or a relative position of an object such as the coffee cup 175. In some implementations, a body motion of the user 160 (e.g., reaching out) and/or attention of the user 160 (e.g., looking at coffee cup 175) are classified or otherwise assessed. In some implementations, objects within the physical environment 150 are identified or classified as interactive. In some implementations, a posture of the user (e.g., hand shape) is generated based on sensor data (e.g., a model identifying 3D positions of joints of the user 160). Generally, computer programs and/or machine learning models may be used to interpret sensor data to identify user activity, attention, and/or environmental features that satisfy a condition to provide context.

In this example of FIG. 7, detecting a reaching and grasping condition satisfies criteria for displaying a context feature to provide context. Specifically, an abstract representation 700 of the coffee cup 175 and an abstract representation 710 of the underlying coffee table 180 are provided in view 200. The representations 700, 710 provide context that may enable a viewer (e.g., user 110) of view 200 to more easily interpret the action of user 160 or otherwise improve the viewer's experience. In this example, the representation 710 provides context for where the coffee cup came from (e.g., on a surface rather than floating in mid-air) and the representation 700 provides context for the user's reaching and grasping motion. In this example, the objects to display are identified based on identifying contact between objects, e.g., detecting based on image/depth data that the coffee cup 175 was resting on coffee table 180 before being grasped and picked up.

In some implementations, a user activity or series of actions (e.g., reaching out, grasping the coffee cup 175 resting on coffee table 180, withdrawing the hand with coffee cup 175 in it, drinking from the coffee cup 175, sitting the coffee cup back down on the coffee table 180, releasing the coffee cup 175, and withdrawing the hand) occurs over time and the representation 260 has corresponding characteristics that change (e.g., get revealed and/or removed) over time. For example, as the user 160 starts reaching out and grasps the coffee cup, representations 700, 710 may fade in. As the user 160 withdraws his or her hand with the coffee cup 175 in it and drinks, the representation 710 of the coffee table 180 may fade out (since it is no longer as relevant to the context). As the user 160 then sits the coffee cup back down on the coffee table 180, representation 710 may reappear. Finally, as the user 160 then withdraws his or her hand without the coffee cup 175, both of the representations 700, 710 may fade away. In this example, the representations 700, 710 of object of physical environment 150 are used to provide context and are adjusted over time, in real-time, to provide an appropriate or limited (e.g., minimal) amount of information useful in understanding the context of the user's current action.

Figure 8:
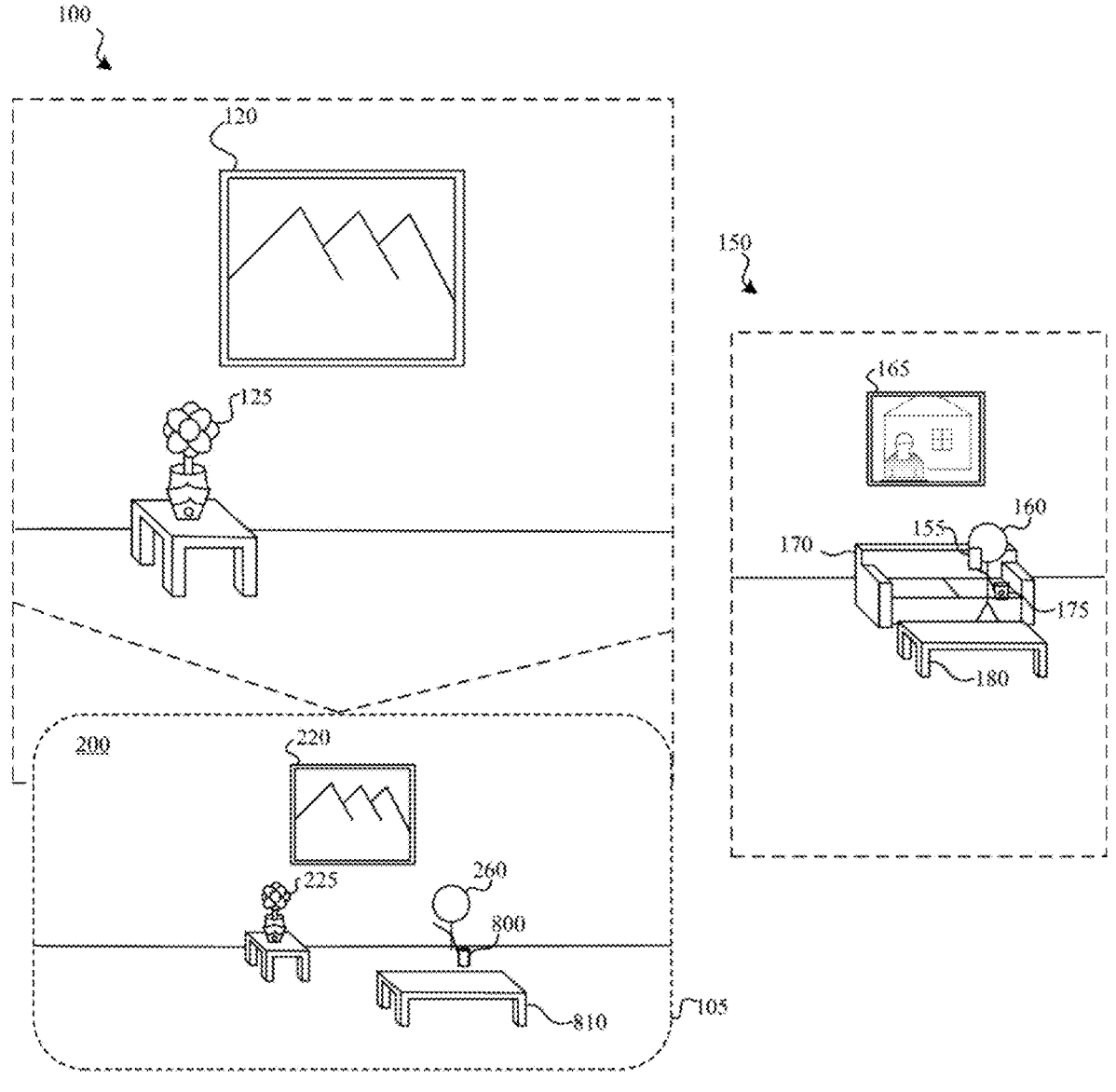

FIG. 8 illustrates another example of user 160 reaching out and grasping the coffee cup 175 in physical environment 150. In this example, based on detecting that the user 160 is reaching out and grasping an object, representation 800 representing the coffee cup 175 and representation 810 representing the coffee table 180 are provided in view 200. In comparison to the representations 700, 710 of FIG. 7, the representations 800, 810 are less abstract and have more characteristics (e.g., size, shape, material, etc.) that correspond more accurately to the actual appearance of the coffee cup 175 and coffee table 180. Representations 800, 810 may be generated based on live and/or or prior sensor data of the objects.

Representation 800 may be a point cloud representation that is based on the position of the coffee cup 175 relative to the user 160 in the physical environment 150. Similarly, representation 810 may be a point cloud representation that is based on the position of the coffee table 180 relative to the user 160 in the physical environment 150. The characteristics of the representations 800, 810 may limit the amount of information about the physical environment 150 that is revealed in the view 200. For example, point cloud representations may not reveal the type, size, or shape of the coffee cup 175 or coffee table 180. Representations 800, 810 may be imposter objects that depict more information than more abstract point cloud representations, e.g., a plain cup may represent coffee cup 175 and a generic table may represent coffee table 180. Such an imposter object may be used to provide realism while preserving user privacy consistent with the user's consent and preferences. The representations 800, 810 may be generated by retrieving object models corresponding to the coffee cup 175 and coffee table 180, respectively. Portions of the representations 800, 810 that are not obtainable based on observation of the coffee cup 175 and coffee table 180 by sensors may be inferred or generated using various techniques. In one example, the coffee cup 175 and/or coffee table 180 is matches with a 3D model for which complete information is available, e.g., identifying the particular brand, unique product identifier, global trade item number, manufacturer part number, etc. of the coffee cup 175 and/or coffee table 180 based on image/sensor data.

The representations 800, 810 provide context that may enable a viewer (e.g., user 110) of view 200 to more easily interpret the action of user 160 or otherwise improve the viewer's experience. In this example, the representations 800, 810 may depict more information (e.g., size, shape, material, condition, etc.) than the more abstract representations 700, 710 of FIG. 7 and thus may provide relatively more context for helping a viewer understand the action of the user 160.

Figure 9:
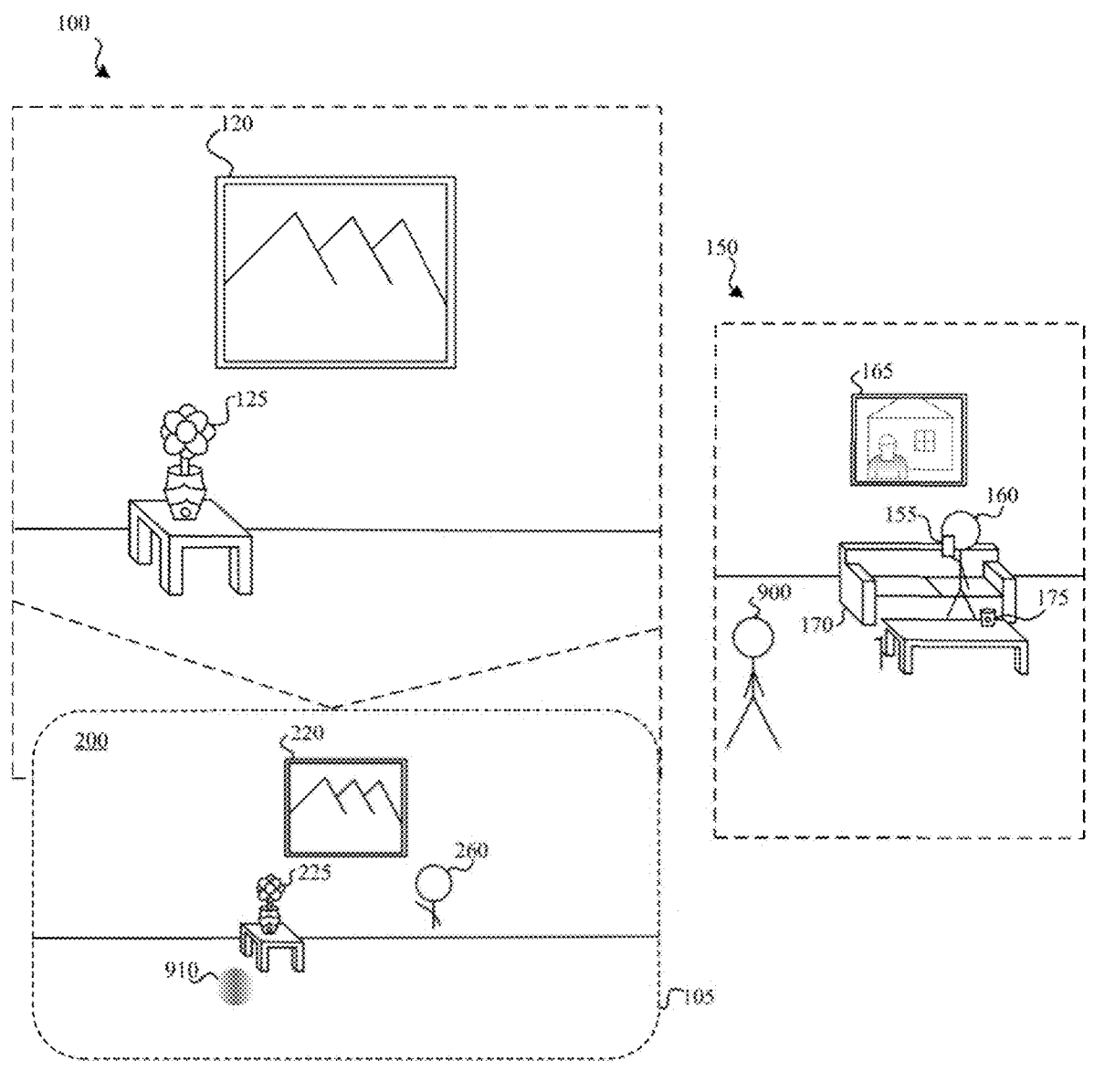

FIG. 9 illustrates user 160 directing attention to another person 900 in physical environment 150. Sensors on electronic device 155 detect this activity. Detecting the attention of the user 160 may be detected based on detecting the user's gaze direction to identify what object the user 160 is looking at or that the user 160 has changed focus. Detecting the attention of the user 160 may additionally or alternatively be determined based on detecting that another person, animal, or other object is doing something (e.g., waving a hand, saying the name of user 160, barking, emitting light, emitting sound, moving, etc.) that corresponds to a potentially attention grabbing event. In some implementations, the environment 150 and the objects within it are classified or otherwise assessed with respect to type, activity, whether such objects are attention seeking, whether such objects are the focus of a user's attention, etc. Generally, computer programs and/or machine learning models may be used to interpret sensor data to identify user activity, attention, and/or environmental features that satisfy a condition to provide context.

In this example of FIG. 9, detecting that another person 900 is present in physical environment 150 satisfies criteria for displaying a context feature to provide context. Specifically, an abstract representation 910 of the person 900 is provided in view 200. Using abstractness of the representation 910 may preserve the privacy of person 900, e.g., regarding the person's actual appearance, for example, by foregoing display of identity, facial features, facial expressions, body features, body language, clothing, etc. Alternatively, a less abstract representation may be used to provide an avatar or more realistic reconstruction of the person 900. The representation 910 provides context that may enable a viewer (e.g., user 110) of view 200 to more easily interpret the action of user 160 or otherwise improve the viewer's experience.

In another example, a condition for displaying context is satisfied when the user 160 interacts with another electronic device, e.g., another mobile device. In such an example, providing a context feature may include providing a realistic, imposter, or abstracted representation of the other electronic device in the view 200. If communication with the other electronic device is possible, content displayed on the other electronic device may be obtained and directly displayed (e.g., based on received data rather than image data) within the view 200, subject to the permission and preferences of user 160. Content on another electronic device may be hidden or revealed within the view 200 provided during the communication session based on a device owner's consent and permissions.

In another example, a condition for displaying context is satisfied when the user 160 leans against something in the physical environment 150, e.g., a wall. In such an example, providing a context feature may include providing a realistic, imposter, or abstracted representation of the object against which the user 160 is leaning in the view 200.

In some implementations, large object interaction and small interactions are treated using different rules and/or criteria. Small objects, for example, may be detected and identified as a type of object (e.g., beverage container, ball, fidget spinner, etc.), while large object may be detected and assessed with respect to characteristics, e.g., having a planar surface, a horizontal or vertical orientation, etc. In some implementations, the conditions for displaying a context feature for small objects depends upon the type of object while the conditions for displaying a context feature for large objects depends upon the physical characteristics of the object. Moreover, the representations of the objects may additionally, or alternatively, be determined based on whether the object is small or large. In one example, recognizing that a user 160 is about to sit upon a couch seat may require recognizing another portion of the couch having a planar surface and determining that the planar surface extends underneath the user 160, without having sensor data available about the physical environment underneath the user 160.

In some implementations, object detection can be performed and only certain types of objects may be displayed. For example, objects such as cups, phones, books, pencils, etc. may be displayed while objects such as food containers, trash, clutter, etc. may not be displayed. Moreover, the way each object is displayed can depend on object type. For example, a cup may be displayed with a realistic appearance while a book or phone may be displayed with an abstract appearance to preserve privacy.

In the example of FIGS. 1-9, the electronic devices 105, 155 are illustrated as hand-held device. The electronic devices 105, 155 may be a mobile phone, a tablet, a laptop, so forth. In some implementations, electronic devices 105, 155 may be worn by a user. For example, electronic devices 105, 155 may be a watch, a head-mounted device (HMD), head-worn device (glasses), headphones, an ear mounted device, and so forth. In some implementations, functions of the devices 105, 155 are accomplished via two or more devices, for example a mobile device and base station or a head mounted device and an ear mounted device. Various capabilities may be distributed amongst multiple device, including, but not limited to power capabilities, CPU capabilities, GPU capabilities, storage capabilities, memory capabilities, visual content display capabilities, audio content production capabilities, and the like. The multiple devices that may be used to accomplish the functions of electronic devices 105, 155 may communicate with one another via wired or wireless communications.

According to some implementations, the electronic device 105 generates and presents an extended reality (XR) environment to one or more users during a communication session. People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

FIG. 10 is a flowchart illustrating a method 1000 for providing a representation of at least a portion of a user and context within a 3D environment other than the user's physical environment. In some implementations, a device such as electronic device 105 or electronic device 155, or a combination of the two, performs method 1000. In some implementations, method 1000 is performed on a mobile device, desktop, laptop, HMD, ear-mounted device or server device. The method 1000 is performed by processing logic, including hardware, firmware, software, or a combination thereof. In some implementations, the method 1000 is performed on a processor executing code stored in a non-transitory computer-readable medium (e.g., a memory).

At block 1010, the method 1000 generates a representation of at least a portion of a user based on an image of the user in a physical environment. This may involve generating a 3D model of at least a portion of the user, for example, based on one or more images and/or other sensor data of the user. The 3D model may be updated over time, e.g., live, as additional sensor data is obtained. A representation may be generated by selecting a 3D avatar based on identifying the user or based on characteristics of the user. In another example, generating the representation of the user comprises generating a point cloud based on sensor data that identifies depth/distance values for different features of the user. Such a point cloud may be densified, for example, based on currently-obtained or previously-obtained image and other sensor data corresponding to the user's appearance. In some implementations, the representation accurately represents the current appearance of a user during a communication session.

At block 1020, the method 1000 provides the representation for inclusion in a view of a three-dimensional (3D) environment provided by an electronic device that is remote from the physical environment. Providing the representation may involve sending or transmitting an electronic communication including the representation to one or more other electronic devices. Providing the representation may involve sending data defining or specifying the representation, e.g., a point cloud, a current or prior reconstruction, an avatar, a generic user model, and/or pose information about the user.

Providing the representation may occur during a communication session involving the user's electronic device in the physical environment and the electronic device that is in another physical environment that is remote from the user's physical environment. The other electronic device (i.e., that is in another physical environment) may generates a view of a 3D environment based on that other physical environment or otherwise, e.g., a virtual 3D environment. The other electronic device may receive the representation of the user and include it within the view of the 3D environment. For example, the other electronic device may display a received point cloud or a current or prior reconstruction of the user. In another example, the electronic device may display a received avatar of the user. In another example, the electronic device may display the representation based received data about the representation, e.g., using distance above the floor to determine how high to display the representation in the 3D environment.

In some implementations, one or more user representations are received from one or more remote electronic devices in one or more physical environments. The one or more received representations may be included within the view of the 3D environment. In one example, the 3D environment is a view of a physical environment of a host of a communication session. In another example, the 3D environment is a virtual reality environment provided by a host of a communication session.

In one example, the view of the 3D environment is provided during a communication session between multiple electronic devices, for example, during a communication session in which all participants view the same 3D environment with representations of one another included within their respective views of the same 3D environment.

At block 1030, the method 1000 determines that a condition to provide context regarding the physical environment is satisfied. For example, this may involve determining that a user action corresponds to an interaction with an object of the physical environment, e.g., the user is sitting down, reaching out, turning to face another person, etc. In one example, determining that the condition to provide context is satisfied involves determining that a user action corresponds to an interaction with the object or an intent to interact with the object. In one example, determining that the condition to provide context is satisfied involves determining that a user action corresponds to sitting on the object or an intent to sit on the object, where the representation of the object is a representation of a sitting surface. In one example, determining that the condition to provide context is satisfied involves determining that a user action corresponds to leaning on the object or an intent to lean on the object. In one example, determining that the condition to provide context is satisfied involves determining that a user action corresponds to grasping the object or an intent to grasp the object. In one example, determining that the condition to provide context is satisfied involves determining that an activity (e.g., barking, siren, alarm, talking, etc.) in the physical environment has a characteristic corresponding to attracting attention of the user or inspiring action by the user.

At block 1040, based on determining that the condition to provide context is satisfied, the method 1000 provides a context feature representing an object of the physical environment for inclusion in the view of the 3D environment provided by the electronic device that is remote from the physical environment. Providing the context feature may involve sending an electronic communication including the context feature to one or more other electronic devices. Providing the context feature may occur during a communication session involving the user's electronic device in the physical environment and the electronic device that is in another physical environment that is remote from the user's physical environment.

Providing the context feature may involve sending data defining or specifying the context feature, e.g., a point cloud representing the object, a point cloud representing an abstraction of the object, a current and/or prior reconstruction, a generic object model, object type information (e.g., identifying "cup," "couch," "plane," etc.), pose information about the object, or object characteristic information (e.g., color). The other electronic device may receive the context feature and include it within the view of the 3D environment or use it to generate a representation of the object for inclusion in the view. For example, the other electronic device may display a received point cloud or a current or prior reconstruction of the context feature. In another example, the electronic device may display a received generic representation of the object such as a generic object model. In another example, the electronic device may display the context feature based received data about the context feature, e.g., using a received color and plane object type to determine to display a plane using the received color.

The object may be a person other than the user, a pet, a living organism, an animate non-living object, or inanimate non-living object including, but not limited to, a table, chair, sofa, couch, ottoman, bench, wall, floor, credenza, countertop, kitchen appliance, etc. An object may be small (e.g., a dime) or large (e.g., the side of a skyscraper). Example context features include a sitting surface, a table and cup, a representation of another person, and a representation of a dog, a representation of a wall, or any other representation of an object that provides context for the user's actions, attention, intentions, or relevant environmental features. The context feature may accurately depict the object, depict an imposter object, or provide an abstraction that corresponds to the type of object, its purpose, and/or general size/shape to provide context while protecting user privacy.

In some implementations, determining that the condition is satisfied is based on assessing a user's hand location/motion/shape and/or understanding the physical environment around the user, including which objects in the physical environment are capable of interaction. In one example, an electronic device evaluates the physical environment around it and identifies potential interaction target objects during the course of a communication session. When the electronic device detects the user's hand moving towards a potential target and/or having characteristics indicative of interacting with the object, it determines that a condition to provide context is satisfied. In another example, the electronic device uses depth sensor information to identify the distance of objects and/or bounding boxes corresponding to object positions and uses this information to identify when a condition is satisfied. In another example, a 3D model (e.g., point cloud, mesh, etc.) is generated for a user's physical environment and semantically labelled (e.g., labeling object types of portions of the model) and interpreted to identify when a condition to provide context is satisfied. For example, sensor data and/or generated data (e.g., 3D models) of the user and/or physical environment may be input to an algorithm or machine learning model trained to determine when a condition to provide context is satisfied. Training data may be provided using manually or automatically labelled data, e.g., time sequenced image/3D model data corresponding to a user sitting down, reaching and grasping an object, leaning against a wall, etc.

In one example, the representation of the object provides a photo-realistic representation of the object. In another example, the representation of the object provides a generic (e.g., imposter) representation based on a type of the object. In one example, the representation of the object is a generic representation that is based on a size and/or shape of the object (e.g., cylinder, flat surface, etc.). In one example, the representation of the object is a generic representation that is based on a function of the object or a type of interaction with the object, e.g., an object one drinks from, an object one sits upon, an object that makes noise, etc. In one example, the representation of an object is abstracted such that object function (e.g., sitting surface) is depicted without revealing object type (e.g., couch).

Figure 11:
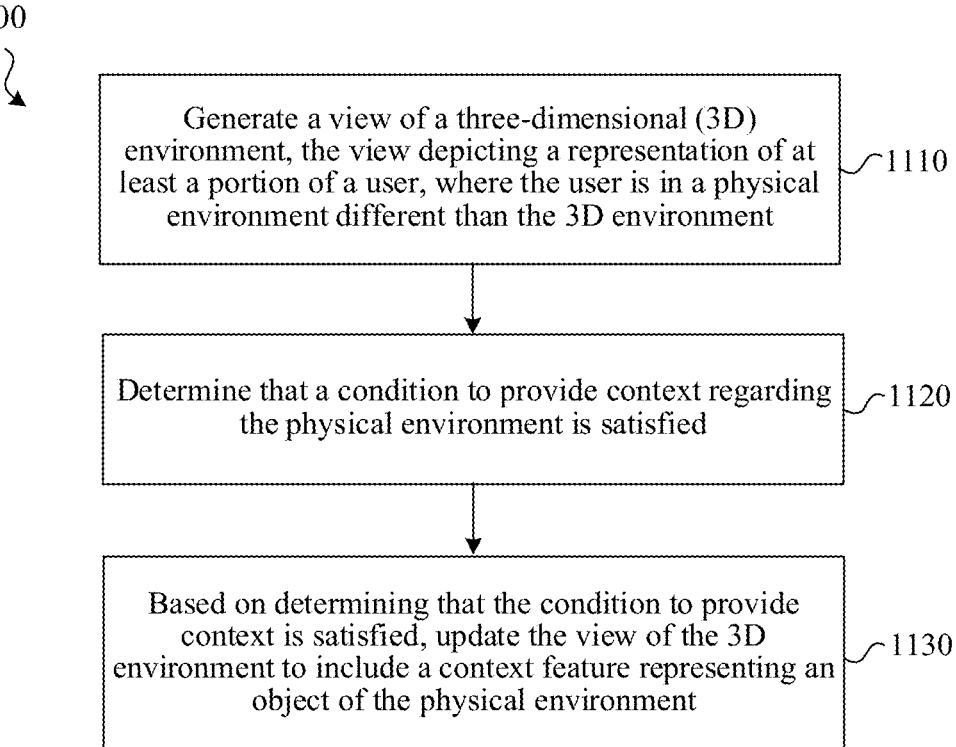
FIG. 11 is a flowchart illustrating a method for providing a representation of at least a portion of a user and context within a 3D environment other than the user's physical environment in accordance with some implementations.

FIG. 11 is a flowchart illustrating a method 1100 for providing a representation of at least a portion of a user and context within a 3D environment other than the user's physical environment. In some implementations, a device such as electronic device 105 or electronic device 155, or a combination of the two, performs method 1100. In some implementations, method 1100 is performed on a mobile device, desktop, laptop, HMD, ear-mounted device or server device. The method 1100 is performed by processing logic, including hardware, firmware, software, or a combination thereof. In some implementations, the method 1100 is performed on a processor executing code stored in a non-transitory computer-readable medium (e.g., a memory).

At block 1110, the method 1100 generates a view of a 3D environment, the view depicting a representation of at least a portion of a user, where the user is in a physical environment different than the 3D environment. In one example, the 3D environment is a view of a physical environment of a host of a communication session. In another example, the 3D environment is a virtual reality environment provided by a host of a communication session. The representation of the user may be generated based on live image, historical images, and/or other sensor data corresponding to the appearance of the user.

In one example, the view of the 3D environment is provided during a communication session between an electronic device in the physical environment and a second electronic device (e.g., a host) in a second physical environment, wherein the 3D environment represents the second physical environment (e.g., the host's living room).

At block 1120, the method 1100 determines that a condition to provide context regarding the physical environment is satisfied. For example, this may involve determining that a user action corresponds to an interaction with an object of the physical environment, e.g., the user is sitting down, reaching out, turning to face another person, etc. In one example, determining that the condition to provide context is satisfied involves determining that a user action corresponds to an interaction with the object or an intent to interact with the object. In one example, determining that the condition to provide context is satisfied involves determining that a user action corresponds to sitting on the object or an intent to sit on the object, where the representation of the object is a representation of a sitting surface. In one example, determining that the condition to provide context is satisfied involves determining that a user action corresponds to leaning on the object or an intent to lean on the object. In one example, determining that the condition to provide context is satisfied involves determining that a user action corresponds to grasping the object or an intent to grasp the object. In one example, determining that the condition to provide context is satisfied involves determining that an activity (e.g., barking, siren, alarm, talking, etc.) in the physical environment has a characteristic corresponding to attracting attention of the user or inspiring action by the user.

At block 1130, based on determining that the condition to provide context is satisfied, the method 1100 updates the view of the 3D environment to include a context feature representing an object of the physical environment. The object may be a person other than the user, a pet, a living organism, an animate non-living object, or inanimate non-living object including, but not limited to, a table, chair, sofa, couch, ottoman, bench, wall, floor, credenza, countertop, kitchen appliance, etc. An object may be small (e.g., a dime) or large (e.g., the side of a skyscraper). Example context features include a sitting surface, a table and cup, a representation of another person, and a representation of a dog, a representation of a wall, or any other representation of an object that provides context for the user's actions, attention, intentions, or relevant environmental features. The context feature may accurately depict the object, depict an imposter object, or provide an abstraction that corresponds to the type of object, its purpose, and/or general size/shape to provide context while protecting user privacy.

In some implementations, determining that the condition is satisfied is based on assessing a user's hand location/motion/shape and/or understanding the physical environment around the user, including which objects in the physical environment are capable of interaction. In one example, an electronic device evaluates the physical environment around it and identifies potential interaction target objects during the course of a communication session. When the electronic device detects the user's hand moving towards a potential target and/or having characteristics indicative of interacting with the object, it determines that a condition to provide context is satisfied. In another example, the electronic device uses depth sensor information to identify the distance of objects and/or bounding boxes corresponding to object positions and uses this information to identify when a condition is satisfied. In another example, a 3D model (e.g., point cloud, mesh, etc.) is generated for a user's physical environment and semantically labelled (e.g., labeling object types of portions of the model) and interpreted to identify when a condition to provide context is satisfied. For example, sensor data and/or generated data (e.g., 3D models) of the user and/or physical environment may be input to an algorithm or machine learning model trained to determine when a condition to provide context is satisfied. Training data may be provided using manually or automatically labelled data, e.g., time sequenced image/3D model data corresponding to a user sitting down, reaching and grasping an object, leaning against a wall, etc.

In one example, the representation of the object provides a photo-realistic representation of the object. In another example, the representation of the object provides a generic (e.g., imposter) representation based on a type of the object. In one example, the representation of the object is a generic representation that is based on a size and/or shape of the object (e.g., cylinder, flat surface, etc.). In one example, the representation of the object is a generic representation that is based on a function of the object or a type of interaction with the object, e.g., an object one drinks from, an object one sits upon, an object that makes noise, etc. In one example, the representation of an object is abstracted such that object function (e.g., sitting surface) is depicted without revealing object type (e.g., couch).

Figure 12:
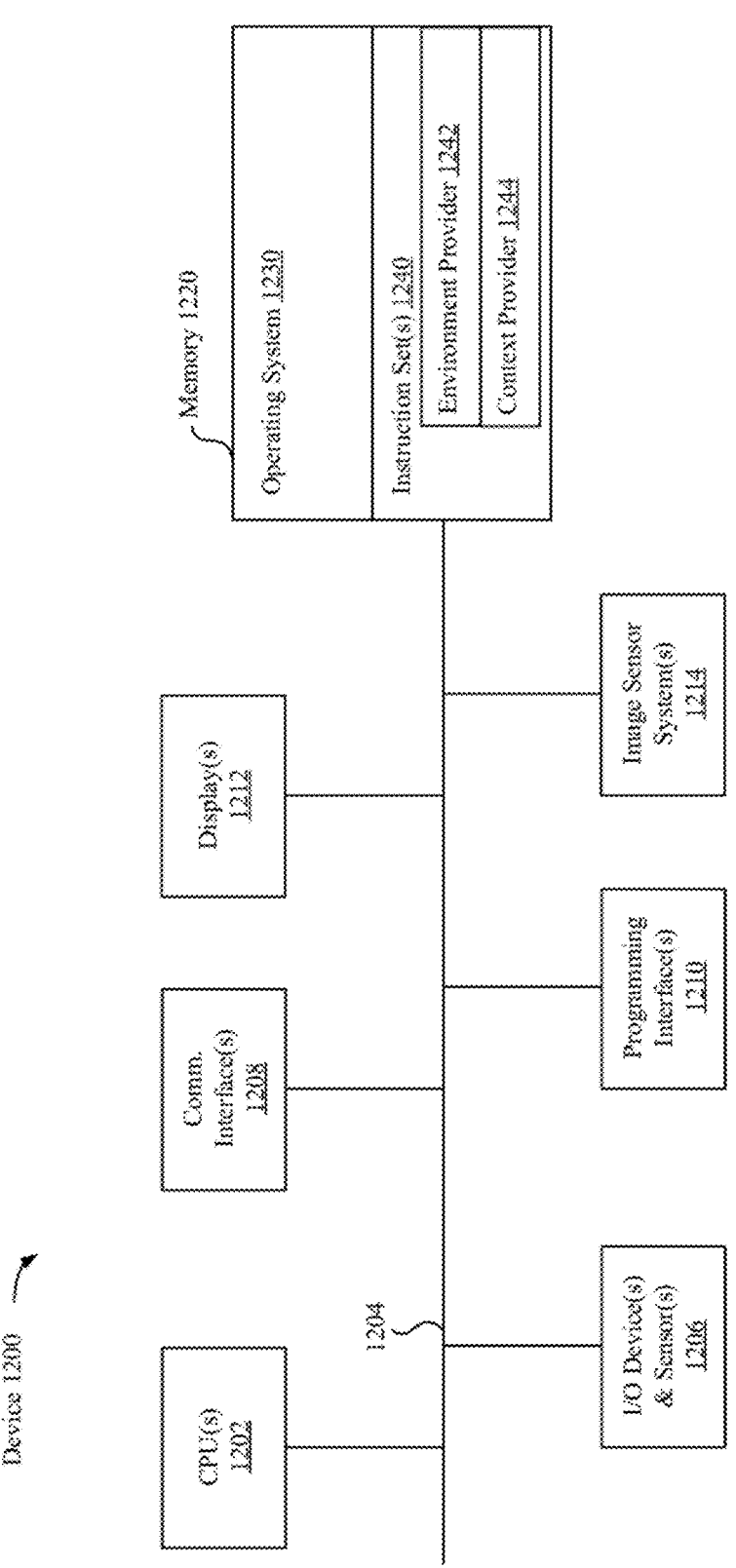
FIG. 12 is a block diagram of an electronic device of in accordance with some implementations.

FIG. 12 is a block diagram of electronic device 1200. Device 1200 illustrates an exemplary device configuration for electronic device 105 or electronic device 155. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1200 includes one or more processing units 1202 (e.g., microprocessors, ASICs, FPGAs, GPUs, CPUs, processing cores, and/or the like), one or more input/output (I/O) devices and sensors 1206, one or more communication interfaces 1208 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1210, one or more output device(s) 1212, one or more interior and/or exterior facing image sensor systems 1214, a memory 1220, and one or more communication buses 1204 for interconnecting these and various other components.

In some implementations, the one or more communication buses 1204 include circuitry that interconnects and controls communications between system components. In some implementations, the one or more I/O devices and sensors 1206 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1212 include one or more displays configured to present a view of a 3D environment to the user. In some implementations, the one or more displays 1212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1200 includes a single display. In another example, the device 1200 includes a display for each eye of the user.

In some implementations, the one or more output device(s) 1212 include one or more audio producing devices. In some implementations, the one or more output device(s) 1212 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1212 may additionally or alternatively be configured to generate haptics.

In some implementations, the one or more image sensor systems 1214 are configured to obtain image data that corresponds to at least a portion of a physical environment. For example, the one or more image sensor systems 1214 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1214 further include illumination sources that emit light, such as a flash. In various implementations, the one or more image sensor systems 1214 further include an on-camera image signal processor (ISP) configured to execute a plurality of processing operations on the image data.

The memory 1220 includes high-speed random-access memory, such as DRAM, SRAM, DDR RAM, or other random-access solid-state memory devices. In some implementations, the memory 1220 includes non-volatile memory, such as one or more magnetic disk storage devices, optical disk storage devices, flash memory devices, or other non-volatile solid-state storage devices. The memory 1220 optionally includes one or more storage devices remotely located from the one or more processing units 1202. The memory 1220 comprises a non-transitory computer readable storage medium.

In some implementations, the memory 1220 or the non-transitory computer readable storage medium of the memory 1220 stores an optional operating system 1230 and one or more instruction set(s) 1240. The operating system 1230 includes procedures for handling various basic system services and for performing hardware dependent tasks. In some implementations, the instruction set(s) 1240 include executable software defined by binary information stored in the form of electrical charge. In some implementations, the instruction set(s) 1240 are software that is executable by the one or more processing units 1202 to carry out one or more of the techniques described herein.

The instruction set(s) 1240 include an environment provider instruction set 1242 configured to, upon execution, provide a view of a 3D environment, for example, during a communication session, as described herein. The instruction set(s) 1240 further include a context provider instruction set 1244 configured to, upon execution, determine to provide context and provide a context feature within a view of a 3D environment as described herein. The instruction set(s) 1240 may be embodied as a single software executable or multiple software executables.

Although the instruction set(s) 1240 are shown as residing on a single device, it should be understood that in other implementations, any combination of the elements may be located in separate computing devices. Moreover, FIG. 12 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/ private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at one or more processors:

generating a representation of at least a portion of a user based on an image of the user in a physical environment;

providing the representation for inclusion in a view of a three-dimensional (3D) environment provided by an electronic device that is remote from the physical environment;

determining that a condition to provide context regarding the physical environment is satisfied; and based on determining that the condition to provide context is satisfied:

identifying an object of the physical environment;

determining characteristics of a context feature representing the object to limit an amount of information about the physical environment to reveal; and providing the context feature representing the object of the physical environment for inclusion in the view of the 3D environment provided by the electronic device that is remote from the physical environment.

2. The method of claim 1, wherein the view of the 3D environment is provided during a communication session between electronic devices in different physical environments.

3. The method of claim 2, wherein the representation of at least the portion of the user is generated based on sensor data obtained during the communication session.

4. The method of claim 1, wherein determining that the condition to provide context is satisfied comprises determining that an action of the user corresponds to an interaction with the object or an intent to interact with the object.

5. The method of claim 1, wherein determining that the condition to provide context is satisfied comprises determining that an action of the user corresponds to sitting on the object or an intent to sit on the object, wherein the context feature representing the object comprises a representation of a sitting surface.

6. The method of claim 1, wherein determining that the condition to provide context is satisfied comprises determining that an action of the user corresponds to leaning on the object or an intent to lean on the object.

7. The method of claim 1, wherein determining that the condition to provide context is satisfied comprises determining that an action of the user corresponds to grasping the object or an intent to grasp the object.

8. The method of claim 1, wherein determining that the condition to provide context is satisfied comprises determining that an activity in the physical environment has a characteristic corresponding to attracting attention of the user or inspiring action by the user.

9. The method of claim 1, wherein determining that the condition to provide context is satisfied comprises using object classification or object classification to determine that the object is of a predefined type of object.

10. The method of claim 1, wherein providing the context feature comprises transmitting data defining the context feature to the electronic device.

11. The method of claim 10, wherein the data transmitted to the electronic device comprises:

a point cloud representing the object;

a point cloud representing an abstraction of the object;

a reconstruction of the object, a generic object model based on the object;

object type information;

object pose information; or object characteristic information.

12. The method of claim 10, wherein the electronic device includes the context feature by including a representation of the object in the view based on the transmitted data.

13. The method of claim 12, wherein the electronic device includes the context feature by:

including a received point cloud, a received reconstruction, or a received generic object model in the 3D environment; and generating the view of the 3D environment with the received point cloud, the received reconstruction, or the received generic object model included.

14. The method of claim 12, wherein the electronic device includes the context feature by:

generating 3D content based on received object type information, received object pose information, or received object characteristic information;

including the 3D content in the 3D environment; and generating the view of the 3D environment with the 3D content included.

15. The method of claim 1, wherein the context feature representing the object provides a photo-realistic representation of the object.

16. The method of claim 1, wherein the context feature representing the object comprises a generic representation based on a type of the object.

17. The method of claim 1, wherein the context feature representing the object comprises a generic representation based on a size and/or shape of the object.

18. The method of claim 1, wherein the context feature representing the object comprises a generic representation based on a function of the object or a type of interaction with the object.

19. The method of claim 1, wherein the characteristics of the context feature are determined to obfuscate a type of the object.

20. The method of claim 1, wherein the characteristics of the context feature are determined to obfuscate a size of the object.

21. The method of claim 1, wherein the characteristics of the context feature are determined to obfuscate a shape of the object.

22. The method of claim 1, wherein determining the characteristics of the context feature representing the object to limit the amount of information about the physical environment to reveal is based on receiving a consent of the user.

23. The method of claim 1, wherein determining the characteristics of the context feature representing the object to limit the amount of information about the physical environment to reveal is based on receiving a preference of the user.

24. The method of claim 23, wherein the preference of the user identifies whether particular objects or types of objects will be revealed.

25. The method of claim 23, wherein the preference of the user identifies an amount of detail to reveal.

26. The method of claim 23, wherein the preference of the user identifies to whom contextual features representing objects will be revealed.

27. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

generating a representation of at least a portion of a user based on an image of the user in a physical environment;

providing the representation for inclusion in a view of a three-dimensional (3D) environment provided by an electronic device that is remote from the physical environment;

determining that a condition to provide context regarding the physical environment is satisfied; and based on determining that the condition to provide context is satisfied:

identifying an object of the physical environment;

determining characteristics of a context feature representing the object to limit an amount of information about the physical environment to reveal; and providing the context feature representing the object of the physical environment for inclusion in the view of the 3D environment provided by the electronic device that is remote from the physical environment.

28. A non-transitory computer-readable storage medium storing program instructions executable via one or more processors to perform operations comprising:

generating a representation of at least a portion of a user based on an image of the user in a physical environment;

providing the representation for inclusion in a view of a three-dimensional (3D) environment provided by an electronic device that is remote from the physical environment;

determining that a condition to provide context regarding the physical environment is satisfied; and based on determining that the condition to provide context is satisfied:

identifying an object of the physical environment;

determining characteristics of a context feature representing the object to limit an amount of information about the physical environment to reveal; and providing the context feature representing the object of the physical environment for inclusion in the view of the 3D environment provided by the electronic device that is remote from the physical environment.

* * * * *